No. 757,394. PATENTED APR. 12, 1904.
R. EICKEMEYER, DEC'D.
R. EICKEMEYER, JR., C. EICKEMEYER & M. T. EICKEMEYER, EXECUTORS.
MEANS FOR VARIABLY OPERATING AND CONTROLLING ELECTRIC MOTORS.
APPLICATION FILED JUNE 2, 1893.
NO MODEL. 6 SHEETS—SHEET 1.

Fig. 1.

No. 757,394. PATENTED APR. 12, 1904.
R. EICKEMEYER, DEC'D.
R. EICKEMEYER, JR., C. EICKEMEYER & M. T. EICKEMEYER, EXECUTORS.
MEANS FOR VARIABLY OPERATING AND CONTROLLING ELECTRIC MOTORS.
APPLICATION FILED JUNE 2, 1893.
NO MODEL. 6 SHEETS—SHEET 2.

Attest:
Philip F. Larner
Lowell Bartle

Inventor:
Rudolf Eickemeyer
By
Attorneys

No. 757,394. PATENTED APR. 12, 1904.
R. EICKEMEYER, DEC'D.
R. EICKEMEYER, JR., C. EICKEMEYER & M. T. EICKEMEYER, EXECUTORS.
MEANS FOR VARIABLY OPERATING AND CONTROLLING ELECTRIC MOTORS.
APPLICATION FILED JUNE 2, 1893.
NO MODEL. 6 SHEETS—SHEET 3.

No. 757,394. PATENTED APR. 12, 1904.
R. EICKEMEYER, DEC'D.
R. EICKEMEYER, JR., C. EICKEMEYER & M. T. EICKEMEYER, EXECUTORS.
MEANS FOR VARIABLY OPERATING AND CONTROLLING ELECTRIC MOTORS.
APPLICATION FILED JUNE 2, 1893.
NO MODEL. 6 SHEETS—SHEET 4.

No. 757,394. PATENTED APR. 12, 1904.
R. EICKEMEYER, DEC'D.
R. EICKEMEYER, JR., C. EICKEMEYER & M. T. EICKEMEYER, EXECUTORS.
MEANS FOR VARIABLY OPERATING AND CONTROLLING ELECTRIC MOTORS.
APPLICATION FILED JUNE 2, 1893.
NO MODEL. 6 SHEETS—SHEET 6.

Witnesses:

Inventor:
Rudolf Eickemeyer.
by Albert G. Davis
Att'y.

No. 757,394. Patented April 12, 1904

UNITED STATES PATENT OFFICE.

RUDOLF EICKEMEYER, OF YONKERS, NEW YORK; RUDOLF EICKEMEYER, JR., CARL EICKEMEYER, AND MARY T. EICKEMEYER EXECUTORS OF SAID RUDOLF EICKEMEYER, DECEASED.

MEANS FOR VARIABLY OPERATING AND CONTROLLING ELECTRIC MOTORS.

SPECIFICATION forming part of Letters Patent No. 757,394, dated April 12, 1904.

Application filed June 2, 1893. Serial No. 476,351. (No model.)

*To all whom it may concern:*

Be it known that I, RUDOLF EICKEMEYER, of Yonkers, in the county of Westchester and State of New York, have invented certain new and useful Improvements in and Means for Variably Operating and Controlling Electric Motors; and I do hereby declare that the following specification, taken in connection with the drawings furnished and forming a part of the same, is a clear, true, and complete description of my invention.

The main object of my invention is to provide electric-motor organizations which can be efficiently operated under widely-varied conditions with respect of speed and working duty, and in part to that end I have organized a motor-armature with separate sets of windings and separate commutators and provided for operating said windings either independently or in parallel or in series connection, and I have devised means for controlling and switching the several electric connections, including a suitable outside resistance or rheostat, so that the changes in working the armature-winding to and from series or parallel can be made while the motor is in operation and in such a manner as to obviate the danger incident to the short-circuiting of a portion of an armature-winding while it is producing electromotive force.

Certain portions of my invention are applicable to any electric-motor organization which it may be desirable to operate variably while in motion, as from series to shunt and shunt to series, and especially to such organizations as involve the use of separate sections or sets of coils for affording the motor-driving magnetism, whether said separate coils be in the field or in the armature, or in both.

After describing my invention in connection with the accompanying drawings the features referred to and others deemed novel will be duly specified in the several clauses of claim hereunto annexed.

Referring to the drawings.

Figure 1:
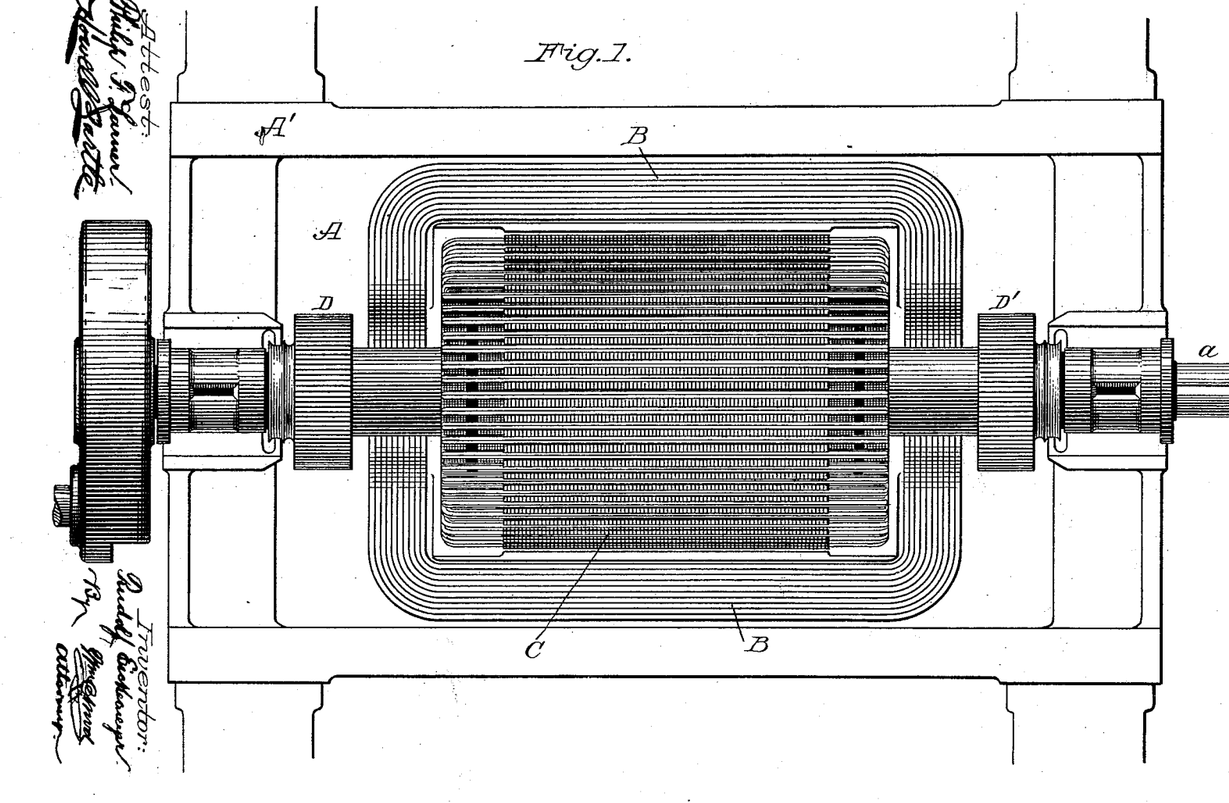
Figure 1 illustrates a bipolar motor embodying a portion of my present invention in plan view, but without the top of the motor casing or shell and also without a portion of the field-coils.

In Figure 1 the motor A includes a part of such a frame A' as is employed by me for street-car motors, it being understood that said frame constitutes a portion of the magnetic system, as in machines heretofore patented to me, and that the field-coils B, as in said machines, surround the armature C longitudinally within the shell or casing, and that said field-coils include several sections, massed and divided into two portions, which at their ends are located on opposite sides of the armature-shaft. It is to be understood, however, that my present improvements are not restricted either to street-car motors or to machines having field-coils thus arranged with reference to the frame and armature nor to one in which the frame constitutes a portion of the magnetic system.

As here shown, the drum-armature C carries crank-wheels on its shaft $a$, as for a pitman connection; but it is immaterial to my present invention in what manner power may be communicated from the armature.

Figure 2:
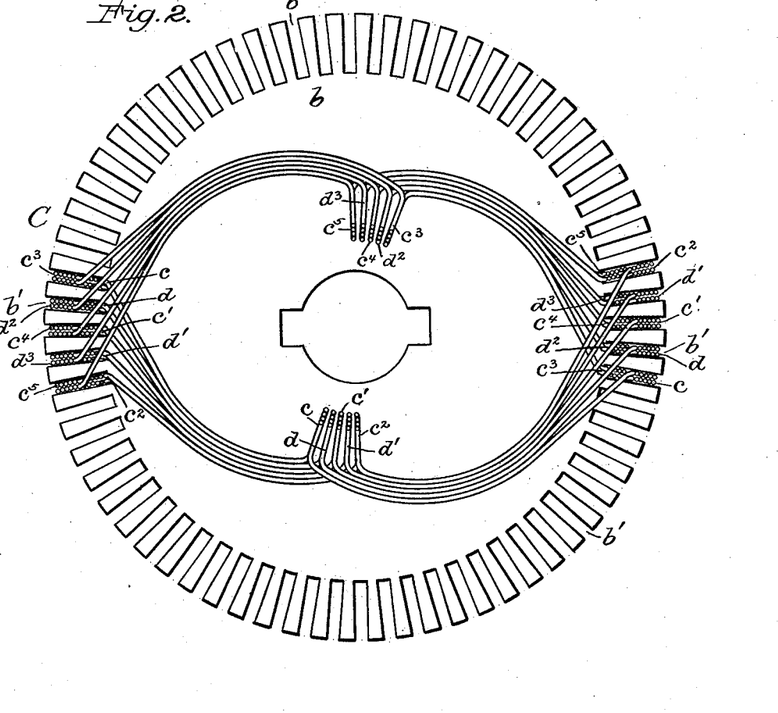
Fig. 2 illustrates the armature-core of the motor in end view with portions of two separate sets of winding thereon.

The armature-core $b$ is notched longitudinally on its periphery, as provided for in my Letters Patent No. 377,996, February 14, 1888, for the reception of the sides of the armature-coils, each notch or recess $b'$ containing the sides of two separate coils or sections of winding and securely confining them in position as against rotative displacement. As indicated in Fig. 2, one side of each coil in a notch $b'$ underlies the appropriate side of another coil, the relative positions of the other sides of these two coils being reversed at the opposite side of the armature-core, or, in other words, one side of each coil or section overlies one side of another coil at one side of the core, and on the other side of the core the overlying of the other sides of the same coils is reversed, as disclosed in my said Letters Patent No. 377,996. It is be understood that these coils are counterparts and have each a long side and a short side and are flattened, curved, and offset at their ends and are otherwise in accordance with the invention disclosed in my said Letters Patent. In this armature, however, these coils are so assembled on the core as to constitute two separate sets of winding, and hence two independent commutators D and D' are employed. If the terminals of the several winding-sections should be assembled at one end of the armature, these commutators would then be located side by side; but, as here shown, the winding-terminals are alternated in position, so that a commutator is required at each end of the armature, thus greatly simplifying the connection of the coils with the commutator-bars.

Figure 3:
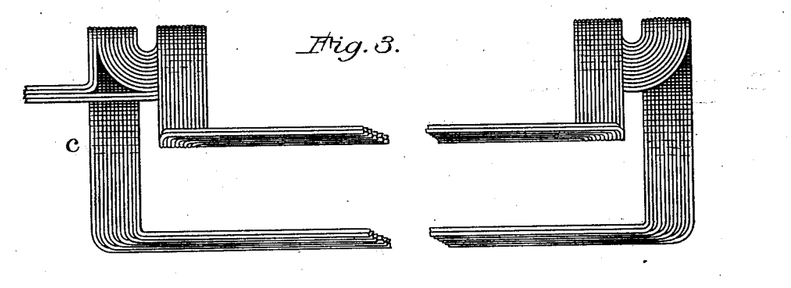
Fig. 3 illustrates in side view one of the counterpart coils appropriate to either set of the armature-windings, the central portions of the sides of the coil being broken away.

Referring to Figs. 2 and 3, it is to be understood that although the coils or winding-sections are all alike they are designated $c\ c'\ c^2$, &c., and $d\ d'\ d^2$, &c., for indicating the two separate sets of windings and also the sections or coils in each set. In Fig. 3 the long (or outer) side of the coil is clearly indicated as well as the short (or inner) side, both being broken away centrally. This figure also shows the two ends of the coil, the central offsets, and the laterally-projecting terminal at one end. This coil $c$ has its terminal at the left-hand end of the coil, and hence it will be assumed to belong to the $c$ series of coils, Fig. 2; but this same coil if turned end for end, so that its terminals would be at the opposite end of the core, would then belong to the $d$ series of coils. These coils or sections are composed of two wires wound in six turns, but if a single wire was used there would be twelve turns, or if six wires were used there would be two turns, and with but one turn twelve wires could be used, or the two wires of each coil may be connected to separate but adjacent commutator-bars, so that each armature-coil with respect of commutation will in substance constitute two adjacent coils of the same winding and be what I will term a "double coil," it being understood that variations as to the number of wires and turns will involve no portion of my present invention so long as two or more separate sets of windings and two or more commutators are employed.

As shown in Fig. 2, coil $c$ has its long side in a core-notch overlying the short side of the coil $c^3$, the long side of the latter on the other side of the armature overlying the short side of the coil $c$. The next coil $d$ has its long side in the next core-notch overlying the short side of the coil $d^2$, the long side of the latter at the other side of the core overlying the short side of the coil $d$, and so on throughout the entire winding, a long and a short side of each coil in each set occupying alternate notches, the intervening notches being occupied by short and long sides of the coils in the other set throughout the entire two sets of winding, as shown in Fig. 1. This combination with an armature-core of two separate sets of windings and their commutators, each two coils in each winding having sides which reversely overlie each other and are located between similar reversely overlaid sides of coils belonging to the other winding, constitutes a feature of my invention whether the sides of said coils occupy longitudinal recesses in the core or are otherwise secured thereon against rotative displacement; but I do not claim this combination in the present application, since it has been made the subject-matter of a divisional application, Serial No. 107,147, filed May 13, 1902.

Figure 4:
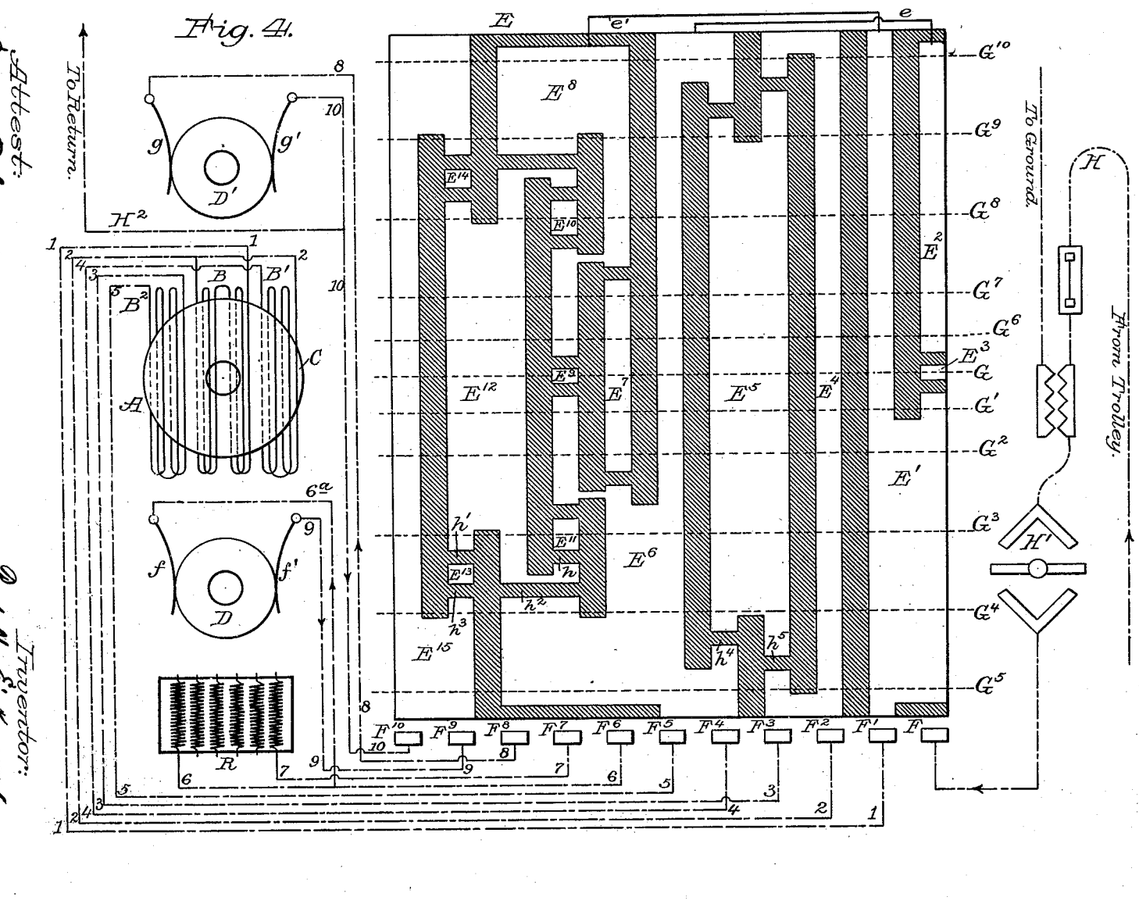
Fig. 4 is a diagrammatic view of switching mechanism as devised by me for working a series-wound motor having the separate sets of armature-windings.

In Fig. 4 I have illustrated the switching apparatus devised for use with my double armature-winding in series motors, the same being especially adapted to use on electric street-cars. This controlling-switch E in many respects resembles those which were disclosed in my patent for improvements in electric locomotives, No. 588,104, granted August 10, 1897. The several switch-plates are preferably arranged cylindrically, so as to coöperate with stationary brushes; but the latter may be movable and the switch-cylinder stationary, or the switchboard may be flat and either movable or stationary. There are here fifteen switch-plates, (designated, respectively, $E'$ to $E^{15}$.) The plates $E^2$ and $E^6$ are electrically connected by a subconductor $e$, and another subconductor $e'$ connects the plate $E'$ with plate $E^8$; but with these exceptions the several plates are insulated from each other. Eleven brushes are employed, and these are designated, respectively, F to $F^{10}$. The motor A is shown with its field-coils in three sections, as at B, B', and $B^2$, and its two commutators are shown at D and D'. The several transverse dotted lines at the one side of the central dotted line G, as at $G'$, $G^2$, $G^3$, $G^4$, and $G^5$, and those at the other side, as at $G^6$, $G^7$, $G^8$, $G^9$, and $G^{10}$, will be hereinafter referred to for indicating the electrical connections which are made when the brushes occupy said lines, the central line G indicating the position of rest. The line-wire H from the trolley and by way of a safety-fuse, lightning-arrester, and a cut-out switch H' is connected with the brush F. The brush F' by wire 1 connects with one terminal of the central section B of the motor field-coil. The brush $F^2$ by wire 2 connects with the other terminal of the field-coil section B and also with one terminal of the field-coil section $B'$. The brush $F^3$ by wire 3 connects with one terminal of the field-coil section $B^2$. The brush $F^4$ by wire 4 connects with the other terminal of the field-coil section $B'$. The brush $F^5$ by wire 5 connects with the other terminal of the field-coil section $B^2$. The brush $F^6$ by wire 6 connects with one terminal of the outside resistance R and also by branch wire $6^a$ with one brush $f$ of the commutator D. The brush $F^7$ by wire 7 connects with the other terminal of the resistance R. The brush $F^8$ by wire 8 connects with the brush $g$ of the commutator $D'$. The brush $F^9$ by wire 9 connects with the brush $f'$ of the commutator D, and the brush $F^{10}$ by wire 10 connects with the exit or return line wire $H^2$, and this latter is also connected with the brush $g'$ of the commutator $D'$.

The controlling-switch E and the cut-out switch $H'$ are to be understood as being so connected mechanically that the initial and the final return movement of the switch E in either direction operates the cut-out switch, so that when the several brushes occupy the dotted line G the brush-bar of the cut-out $H'$ is in the position indicated, and the connection with the line-wire H is cut off, the brush F then resting on the isolated switch-plate $E^3$. When the brushes occupy the dotted line $G'$, the cut-out switch has been in the meantime operated and current delivered by brush F to the switch-plate $E'$.

When the brushes occupy the dotted line $G^2$, the two armature-windings, (by way of their two commutators D and $D'$,) the resistance R, and the field-coil sections B, $B'$, and $B^2$ are all connected in series, as follows: from brush F to plate $E'$ and from brush $F'$ by wire 1 through the field-coil sections B and $B'$, thence on wire 4 to brush $F^4$ on plate $E^5$, thence by brush $F^3$ by wire 3 through the coil $B^2$, thence by wire 5 to brush $F^5$ and plate $E^6$, thence out by brush $F^7$ and wire 7 through resistance R out on wire 6 to wire $6^a$. The brush $F^6$ at line $G^2$, and resting on the isolated plate $E^7$, the current passes from the resistance via wire 6 and wire $6^a$ into one of the armature-windings commutated at D by way of the commutator-brush $f$, and thence out by commutator-brush $f'$ and wire 9 to brush $F^9$ and plate $E^{12}$, thence by brush $F^8$ and wire 8 to the commutator-brush $g$ through the other set of winding commutated at $D'$ out at commutator-brush $g'$, and thence by wire 10 out on return-wire $H^2$.

In passing from the position $G^2$ to $G^3$ the resistance R is first short-circuited, the brushes $F^6$ and $F^7$ first bearing on the same plate $E^6$, the brush $F^7$ then passing from that plate to the isolated plate $E^{11}$, the resistance is still short-circuited, leaving the two armature-windings and the three field-coil sections still in series.

In passing from the position $G^3$ to $G^4$ the brushes $F^7$ and $F^9$ bridge the gaps $h$ and $h'$, respectively, between the isolated plate $E^{11}$ and plate $E^{12}$ and plate $E^{12}$ and the isolated plate $E^{13}$, thus for a moment connecting brushes $F^7$, $F^8$, and $F^9$ by way of the plate $E^{12}$ and shunting the armature-winding commutated at D by the resistance R. The brush $F^9$ then leaving plate $E^{12}$ bears upon the isolated plate $E^{13}$, so that when the brushes are midway of the positions $G^3$ and $G^4$ the current is cut off from that armature-winding which is commutated at D and passes in series through the resistance, the three sections of field-coil, and the other armature-winding which is commutated at $D'$.

The brushes $F^7$, $F^8$, and $F^9$ after passing the gaps $h^2$ $h^3$ between plates $E^{12}$ and $E^6$ and between the isolated plate $E^{13}$ to $E^{15}$ next reach the position $G^4$ and connect the two sets of armature-winding in parallel and short-circuits the resistance, its brushes $F^6$ and $F^7$ then resting on plate $E^6$, but the current passes from brush $F^6$ on wire 6 to wire $6^a$, brush $f$ at commutator D, and out at commutator-brush $f'$, as before, both armature-windings thus receiving current separately by way of plate $E^6$ and the brushes $F^6$ and $F^8$, the two windings being then in parallel, but in series to the three field-coil sections B, $B'$, and $B^2$, these being still in series with each other. Each of the several brushes has a bearing-face of such length that it can readily bridge or span the several gaps, as at $h$ $h'$, &c.

While passing from the position $G^4$ to $G^5$ the brush $F^4$ leaves the switch-plate $E^5$ and in passing the gap $h^4$ short-circuits the field-coil section $B^2$ by coupling the plate $E^5$ with $E^6$ by way of brushes $F^3$ $F^4$, and then the brush $F^3$ in leaving plate $E^5$ cuts out the field-section $B^2$; but when said brush $F^3$ passes the gap $h^5$ and bears upon the switch-plate $E^4$ the field-coils $B'$ and $B^2$ are then connected in parallel, the position $G^5$ being that of full speed, the current then passing from the trolley-wire through the field-coil section B and through the field-coil sections $B'$ $B^2$ in parallel, and also through the two armature-windings in parallel.

In returning from position $G^5$ to G the several changes are appropriately reversed. For driving the motor in the opposite direction the brushes F and $F'$ in passing from line G to $G^6$ cause the current to be delivered to the field-coils in a direction opposite to that first described, because the plates $E'$ and $E^2$ are respectively connected by the conductors $e'$ and $e$ with the plates $E^8$ and $E^6$. The small isolated plates $E^{10}$ and $E^{14}$ correspond in function with the plates $E^{11}$ and $E^{13}$, and all of the changes before described are effected by this half of the switch with the exception of the change in direction of the current in the field-coils.

Figure 7:
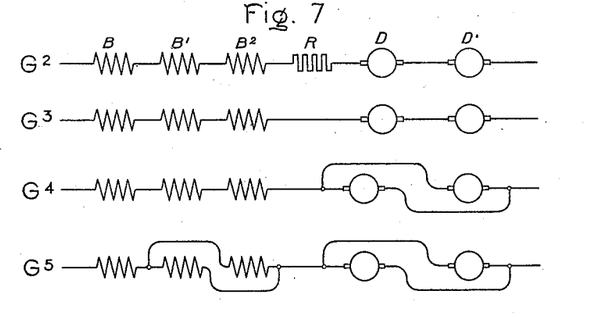
Figs. 7, 8, and 9 are diagrams illustrating the connections made by the switching mechanisms of Figs. 4, 5, and 6, respectively.

The circuit connections for the positions $G^2$, $G^3$, $G^4$, and $G^5$ are shown in Fig. 7. In the positions $G^7$ to $G^{10}$ the connections are the same as those shown in Fig. 7, with the exception that the current is delivered to the field-coils in the opposite direction, so that the direction of rotation of the motor is reversed.

Figure 5:
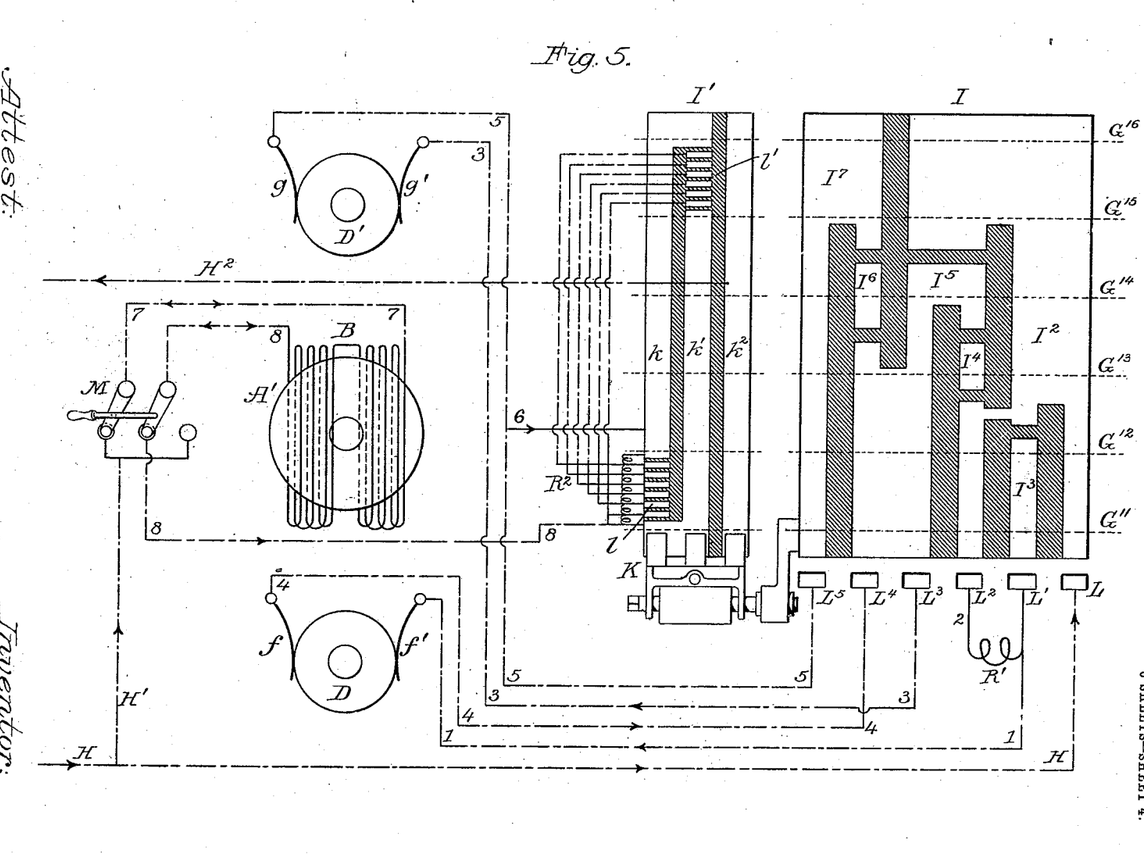
Fig. 5 diagrammatically illustrates switching mechanism as devised by me for working a shunt-wound motor having the double-wound armature.

The application of the double armature-winding and a controlling-switch to a shunt-machine is illustrated in Fig. 5. The motor A' has a double-wound armature with two commutators D and D', as before described, with brushes $f f'$ and $g g'$. The motor field-coil B is in two parts, but connected so as to only operate as one coil without any variations except as to reversal of the exciting-current. The contact-surfaces of this switch are shown in plane projection, the switch being in two sections, the one at I being movable and the other at I' stationary. The switch-section I has six conducting-plates, designated $I^2$, $I^3$, $I^4$, $I^5$, $I^6$, and $I^7$, electrically insulated from each other. The stationary switch-section I' has three conducting-plates, and it is so located with reference to the movable switch-section I that a laterally-projecting triple brush K, carried by the movable section, will be moved in contact with the surfaces of the plates $k$ and $k'$ and $k^2$. There are in this switch six brushes L, L', $L^2$, $L^3$, $L^4$, and $L^5$, electrically connected, as follows: The entering line-wire H connects with brush L. The brushes L' and $L^2$ are connected with each other by way of wire 2 through a resistance R', and both brushes by wire 1 are connected with the brush $f'$ of the armature-commutator D. The brush $L^3$ by wire 3 is connected with the armature-commutator D' at its brush $g'$. The brush $L^4$ by way of wire 4 connects with the commutator D at its brush $f$. The brush $L^5$ by wire 5 connects with the commutator-brush $g$ at commutator D, and also by wire 6 with the plate $k$ of the stationary switch-section I'. The plates $k$ and $k'$ are separated by two groups of connected resistance-blocks at $l$ and $l'$, appropriately connected with the resistance $R^2$. The incoming line-wire H branches at H' to a hand-operated reversing-switch M, thence (with this switch in the position shown) by wire 7 to and through the motor field-coil B out on wire 8, which connects directly with the plate $k'$ and by way of the resistance $R^2$ with the plate $k$. The exit line-wire $H^2$ is connected directly with the plate $k^2$ of the stationary switch-section I'. The several transverse dotted lines $G^{11}$ to $G^{16}$ indicate several positions, which will be referred to in explanation, it being understood that in this case the reversing of the motor is effected at the reversing-switch M and that the controlling-switch I I' is only relied upon for starting, driving, and stopping the motor. It is also to be understood that a suitable cut-out switch is to be employed—as, for instance, as described in connection with Fig. 4—and that said cut-out switch is operated during the initial and the final movements of the switch in passing from and back to the position $G^{11}$, and it will be seen in this Fig. 5 that the brush K of the stationary switch-section I' initially connects the resistance $R^2$ with the armature-circuit or circuits, as is necessary in a shunt-motor. With the main-line connection established with the motor-circuit and the switch-brushes on line $G^{11}$ the current passes from the line-wire H to switch-brush L and plate $I^2$, thence from switch-brush $L^2$ by wire 2 and resistance R' to wire 1 of brush L', (this latter being then on an isolated switch-plate $I^3$,) to brush $f'$ of the commutator D, through one armature-winding, out at commutator-brush $f$, and on wire 4 to brush $L^4$ and switch-plate $I^5$, thence by brush $L^3$ and wire 3 to brush $g'$ of the commutator D', through the other armature-winding, and out at brush $g$ by wire 5 to wire 6 and plate $k$, thence through resistance $R^2$ to plate $k'$, and thence by brush K to plate $k^2$ and out on line-wire $H^2$.

The current from the main-line wire H, branching at H', passes through the reversing-switch M on wire 7 to and through the motor field-coil B, and thence on wire 8 to one end of the plate $k'$ and via brush K to plate $k^2$ of the stationary switch-section I', out on line-wire $H^2$, and therefore with the brushes on line $G^{11}$ the two armature-windings are in series with each other and also with the two resistances R' $R^2$ and the motor field-coil is excited.

In passing from the position $G^{11}$ to $G^{12}$ the resistance $R^2$ is gradually short-circuited by the passage of the brush K over the resistance-switch blocks at $l$ to the plate $k$, so that when the switch-brushes are on line $G^{12}$ the resistance $R^2$ is wholly cut out and the current via wire 6 passes directly by brush K to the plate $k^2$ and out on line-wire $H^2$.

In passing from the position $G^{12}$ to $G^{13}$ the brush L' leaves the isolated plate $I^3$ and bears on plate $I^2$, thus short-circuiting the resistance R', the line-current then passing from brush L and plate $I^2$ to brush L' and directly through both armature-windings in series free from the resistance R' and $R^2$.

In passing from position $G^{13}$ to $G^{14}$ the armature-winding commutated at D is first momentarily shunted by the resistance R' and then cut out for a moment, the brush $L^4$ leaving plate $I^5$ and passing to and over the isolated plate $I^6$, thus leaving in circuit only the armature-winding commutated at D' and this winding being in series with the resistance R' when the position $G^{14}$ is occupied.

In passing from position $G^{14}$ to $G^{15}$ the brushes L, L', $L^2$, and $L^3$ soon rest upon the one plate $I^2$ and brushes $L^4$ and $L^5$ both rest on plate I⁷, thus short-circuiting the resistance R' and sending current to both armature-windings in parallel by way of brushes L' and L³ and free from both resistances, this being the position of the switch for securing what may be termed a "normally desirable" speed.

Figure 8:
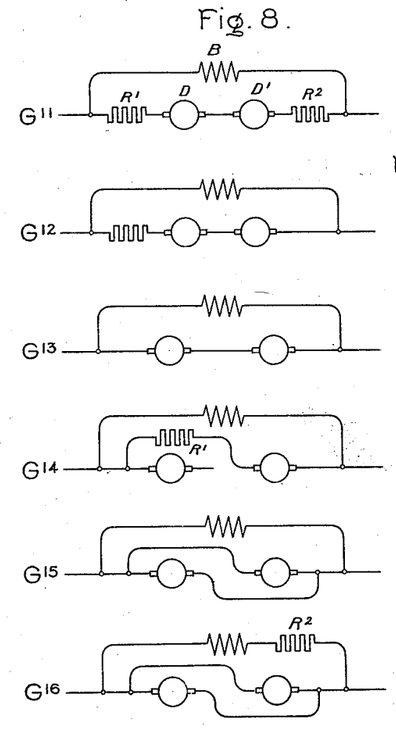

For securing still greater speed the switch is changed from position $G^{15}$ to $G^{16}$, whereby the resistance-blocks at $l'$ are passed by the brush K, thus putting the resistance $R^2$ into the motor-field-coil circuit and weakening the field. The current now passes from line-wire H to brush L and plate $I^2$, thence by brushes L' and L³ through both armature-windings in parallel to brush $L^4$, plate I⁷, and brush $L^5$ and wire 6 to plate $k$, brush K, and plate $k^2$, from which the current passes out on the line-wire terminal $H^2$. In the meantime the current from line-wire H by wire H' passes through the motor field-coil B to plate $k'$ through resistance $R^2$ to brush K and plate $k^2$ out on line-wire $H^2$. In other words, both armature-windings are in series with each other and with resistance R' when the switch-brushes occupy line $G^{12}$. Then when on line $G^{13}$ the armature-windings are in series without said resistance; then when on line $G^{14}$ one armature-winding is in series with resistance R'; then when on line $G^{15}$ both armature-windings are in parallel and without either resistance, and, finally, on line $G^{16}$ both armatures are in parallel and without resistance; but the motor-field-coil circuit includes the resistance $R^2$. In moving the switch backwardly these several changes are reversely made in regular order. The connections for the positions $G^{11}$ to $G^{16}$, inclusive, are shown in Fig. 8.

Figure 6:
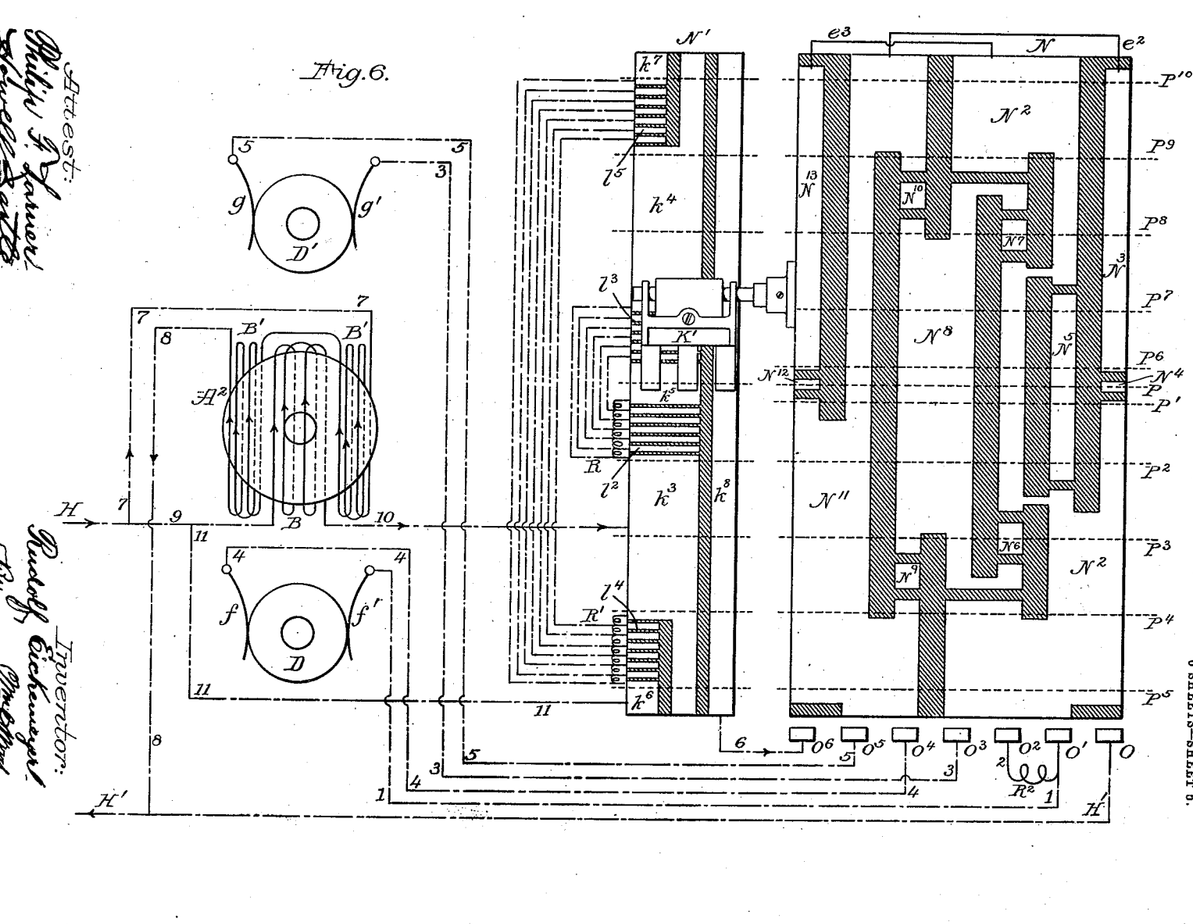
Fig. 6 in like manner illustrates switching mechanism as devised by me for working a compound motor having the double-wound armature.

A compound machine embodying the double-wound armature requires the use of portions of the series and shunt wound organizations already described—as, for instance, as shown in Fig. 6, wherein the motor $A^2$ has a series field-coil B and a shunt field-coil B', this latter, as here shown, being in two connected parts, with the series coil between them; but it is to be understood that the relative arrangement of these coils to each other is immaterial and that in this organization both coils magnetize in the same direction. This controlling-switch, like that in Fig. 5, includes a movable section N and a stationary section N'. The movable section has twelve contact-plates, respectively, (designated $N^2$ to $N^{13}$.) The plates $N^3$ and $N^{11}$ are electrically connected by a conductor $e^2$, and plates $N^2$ and $N^{13}$ are connected by another conductor, $e^3$, the other plates being insulated from each other. The movable switch-section N carries a brush K', which sweeps over the plates of the stationary switch-section N'. This stationary switch-section has six plates beside those used in connection with the resistance. The plates $k^3$, $k^4$, $k^5$, $k^6$, and $k^7$ are traversed by two of the three brush-arms of the brush K', which also sweep over small groups of small plates at $l^2$, $l^3$, $l^4$, and $l^5$, coupled with the resistances R and R'. The plate $k^8$ is swept by the other of the three brush-arms. The plates at $l^2$ $l^3$ of resistance R (connected by outside conductors) are located centrally, and they separate the central plate $k^5$ from the plates $k^3$ and $k^4$. The plates at $l^4$ and $l^5$ of the resistance R' are also connected by outside conductors and are located near the two ends of the switch-section N', and they separate, respectively, the small plate $k^6$ from plate $k^3$ and plate $k^7$ from the plate $k^4$, these plates $k^6$ and $k^7$ being connected directly by an outside conductor, clearly shown. The plates $k^3$ and $k^4$ are also connected by an outside conductor, as indicated. Seven brushes are employed with the movable switch-section N, as at O, O', $O^2$, $O^3$, $O^4$, $O^5$, and $O^6$, which are connected by conducting-wires, as follows: The brush O is coupled to the outgoing line-wire H'. The brush O' by wire 1 connects with commutator-brush $f'$ through the armature-winding commutated at D. The brush $O^2$ connects by wire 2 with resistance $R^2$ and thence with the wire 1 of brush O' and thence to commutator-brush $f'$. The brush $O^3$ connects by wire 3 with the commutator-brush $g'$ through the armature-winding commutated at D'. The brush $O^4$ by wire 4 connects with the brush $f$ at commutator D. The brush $O^5$ connects by wire 5 with the brush $g$ at commutator D', and the brush $O^6$ connects by wire 6 with the plate $k^8$ of the stationary switch-section N'. The entering line-wire H connects by wire 7 with one terminal of the shunt field-coil B' of the motor and thence by wire 8 with the outgoing line-wire H'. The line-wire H also connects by wire 9 with one terminal of the series field B and thence by wire 10 with the switch-plate $k^3$ of the stationary switch-section N'. The wire 9 branches at shunt-wire 11 and connects directly with the small plate $k^6$ of the stationary section N', and by way of an outside conductor it connects with the other small plate, $k^7$, at the other side of the switch.

The several transverse dotted lines P to $P^{10}$ indicate various positions of the switch, to be hereinafter referred to.

It will be seen that in this organization provision is made for reversing the current in the armature-windings and that the current in the motor field-coils is not reversed, the only change made therein being the weakening of the motor-field by short-circuiting the series field-coil. For reversing the armature-circuits the switch-plates of the movable section N, which control said armature-circuits, substantially correspond with the plates and switch of Fig. 4, which in that organization were relied upon for reversing the field-coils.

Referring to the brush K' on the stationary switch-section N', it will be seen that in passing from the position P to $P^2$ or to $P^7$ this brush will gradually short-circuit the resistance R, which is in the armature-circuit, and also that when said brush K' passes from position P⁴ to P⁵ or from P⁹ to P¹⁰ the resistance R' is gradually short-circuited around the series field-coils B'. With the several brushes on the line P' and a cut-out switch having been operated, as hereinbefore described, the electric circuit from line-wire H is mainly by wire 9 through the series field-coil B and wire 10 to the plate $k^3$ of the stationary switch-section N', while a small portion of the current also passes by wire 11 around the series field to the plate $k^6$ of the switch-section N' through resistance R' to plate $k^3$, from thence through resistance R to the central plate $k^5$, and thence by brush K' to the plate $k^8$ out on wire 6 to brush O⁶ to switch-plate N¹¹, thence by the brush O⁵ through the armature-winding commutated at D' back to brush O³ to plate N⁸, thence by brush O⁴ and wire 4 to and through the armature-winding commutated at D in series through resistance R² to brushes O², the two armature-windings being then in series with each other and with the resistances. The brush O' then (on line P') resting on the isolated plate N⁵, the current passes from brush O² to the plate N² and thence by brush O to the outgoing line-wire H', the current to and from the shunt field-coil B meantime and always passing from the entering line-wire H by wires 7 and 8 to the exit line-wire H'. When the position P² has been reached, no change will have been made except short-circuiting the resistance R by the brush K'. When half-way between the positions P² and P³, the resistance R² is short-circuited, the brushes O' and O² then resting on the same switch-plate N², and on line P³ with the brush O² resting on the small isolated plate N⁶, said resistance R² remains short-circuited.

In passing from line P³ to P⁴ the brush O⁴ leaves plate N⁸, rests for a moment on the isolated plate N⁹, and then bears upon plate N¹¹, so that then two terminals, one from each armature-winding, are connected by the brushes O⁴ (D) and O⁵ (D') with the plate N¹¹, the other terminals of said windings connecting with plate N² and with the outgoing line-wire H' by the brushes O', O³, and O, the two windings being then in parallel and free from the resistances R and R².

In passing from the position P⁴ to P⁵ the only changes made are the cutting out of the resistance R' by the brush K' and short-circuiting the series field-coil B', the current then passing from wire 9 to 11 and plate $k^6$ directly by brush K' to plate $k^8$ and thence to the plate N¹¹ of the movable section N, and, as before described, to the armature-windings via brushes O⁵ and O⁴.

Figure 9:
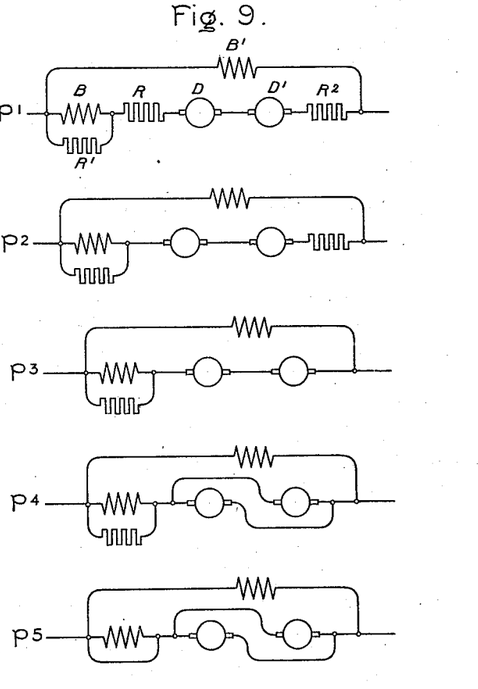

Fig. 9 shows the connections for the positions P' to P⁵, inclusive.

For driving the motor in the opposite direction the current is reversed in the armature-circuit by moving the switch from position P to P⁶. When the brushes rest on line P⁶, the current from wire 6 to brush O⁶ passes to plate N¹³, and thence by conductor $e^3$ to the plate N², and thence through the resistance R² and the armature-windings in series, as before described, but in an opposite direction, all of the changes being repeated, and when the position P¹⁰ is occupied by the brushes the series field-coil is again short-circuited, the circuit being then from line-wire H through the shunt field-coil B, as before, via wires 9 10, plate $k^6$ to plate $k^7$, brush K', plate $k^8$, wire 6, brush O⁶, conductor $e^3$, and plate N², both armature-windings being then in parallel, by way of brushes O' and O³, wires 1 3 and 4 5 to plate N¹¹, conductor $e^2$, to plate N³, and out via brush O to line-wire H'. The circuit connections for the positions P⁶ to P¹⁰ are, therefore the same as those shown for positions P' to P⁵ in Fig. 9, with the exception that the connections to the armature-windings are reversed.

This compound-motor organization Fig. 6 substantially embodies the features of my invention which are employed in the series-motor organization of Fig. 4, although with the compound motor the reversals of current are effected in the armature-windings. So, also, does the compound-motor organization embody that portion of my invention employed in the shunt motor organization Fig. 5, which provides for finally increasing speed by weakening the motor-field, although with the compound motor said weakening is effected by shunting the series field-coil B and leaving only the shunt field-coil in service.

In the three organizations Figs. 4, 5, and 6 separate armature-windings and separate commutators are employed, and in each there is a switch which causes said windings to be operated in series and in parallel, and each has also an outside resistance, which is initially in the armature-circuit and is put into and out of the armature-circuit during the changes in working the armature-windings.

The series-motor organization Fig. 4 includes separate sets of field-coils, which can be worked either in series or in parallel, this being of course impossible in the compound-motor organization Fig. 6; but both of these organizations embody separate sets of field-coils, and the excitation of the field can be varied in a manner appropriate to the variable working of the separate sets of armature-windings. The switches shown in Figs. 5 and 6 are alike with respect of their embodying a set of movable plates with stationary brushes and a set of stationary plates with a brush which is mechanically coupled with the movable plates, so as to sweep upon the set of stationary plates.

It is now to be understood that the switching mechanism described involves the novel feature of introducing and cutting out resistance prior to and succeeding the changes in the coupling of any two sets of magnetizing-coils or sets of separate magnetizing-coils from series to parallel and that this is a special feature of my invention, whether said magnetizing-coils be wholly in the field or wholly in the armature or some of them in the field and others in the armature, and also that another valuable feature of my invention includes the organization in one switch with separate resistances of a set of movable switch-plates and coöperating stationary brushes and a set of stationary switch-plates with coöperating brushes which move with or in harmony with the movable switch-plates regardless of which particular set of switch-plates is in direct circuit with the field-coils and their resistances.

Such other novel features as are peculiar to the several organizations and which may not be properly claimed herein will be made the subject of claims in separate applications.

Having thus described my invention, I claim as new and desire to secure by Letters Patent—

1. The combination substantially as hereinbefore described, of an electric motor having an armature located in a suitable magnetic field, and provided with separate windings and commutators; and a switch which separately controls said windings for operating them in series and in parallel, and which while working said windings in parallel, will also weaken the field of the motor for increasing its speed.

2. The combination in a series-parallel controller, of a movable switch having contact-plates thereon, stationary brushes bearing on said plates, a stationary drum having contact-plates thereon, resistances connected to the contact-plates on said stationary drum, and a set of brushes mechanically connected to the revolving drum and bearing upon the stationary drum, the connections and arrangements being so made that the revolving drum acts to connect the motors in series and in parallel, while the stationary drum acts to vary the resistance of the motor-circuit.

3. In an electric motor, the combination of a series field-winding, a shunt field-winding, two armature-windings, means for connecting the armature-windings in series and in parallel, and means for varying the effect of the series field-winding.

4. The combination with an electric motor having separate sets of field-coils, and separately-commutated armature-windings, of a switch which separately controls the armature-windings, for working them in series and in parallel, and which while operating them in parallel will shunt a part of the field-coil, substantially as described.

5. The combination substantially as hereinbefore described, of an electric motor having in its field-coil circuit an outside resistance, and also having an armature provided with separate windings and separate commutators, and a switch which separately controls said armature-windings for operating them in series and in parallel, and which while operating them in parallel will also relieve the field-coils from the resistance.

6. The combination substantially as hereinbefore described, of an electric motor having a field-coil in separate sections and an armature provided with separate windings, and separate commutators; an outside resistance in the field-coil circuit, and a switch which separately controls the armature-windings for working them in series and in parallel, and which while working them in parallel will cut out resistance from the field-coils, and also shunt a portion of said coils.

7. The combination substantially as hereinbefore described, of an electric motor having an armature provided with separate windings and separate commutators, and also having a field-coil in separate sections; an outside resistance, and a switch which separately controls said armature-windings for working them first in series and in series with the resistance, and then in parallel without the resistance, and which also separately controls field-coil sections, for working them in series and in parallel.

8. The combination with an electric motor having separate armature-windings and separate commutators, of a controlling-switch embodying a set of movable contact-plates and stationary brushes coöperating therewith, and also a set of stationary contact-plates and a coöperating movable brush which is mechanically connected with said movable plates, substantially as described.

9. For use in an electric-motor organization an electric switch embodying in combination substantially as hereinbefore described a set of movable switch-plates and coöperating stationary brushes, and another set of stationary switch-plates with coöperating brushes which move with, or in harmony with the movable switch-plates, and separate resistances which are separately controlled by one of said sets of switch-plates and brushes.

10. In a series-parallel controller for electric motors having shunt and series windings and a plurality of armature-windings, means for connecting the armature-windings in series and in parallel, and means for shunting the series windings.

11. In a series-parallel controller for electric motors having shunt and series windings and a plurality of armature-windings, means for connecting the armature-windings in series and in parallel, means for shunting the series windings by a resistance, and means for varying said resistance.

12. In combination with a motor having shunt and series field-windings and two separate armature-windings, a controlling-switch having its contacts constructed and arranged to first connect the two armature-windings in series with one another and with the series field-winding, then to connect the two armature-windings in parallel and finally to short-circuit the series winding.

13. In combination with a motor having shunt and series field-windings and two separate armature-windings, a controlling-switch having its contacts constructed and arranged to first connect the two armature-windings in series with one another and with the series field-winding in a circuit containing resistance, then to remove said resistance, and finally to connect the two armature-windings in parallel, with the series winding short-circuited.

14. In combination with a motor having shunt and series field-windings and two separate armature-windings, a controlling-switch having a plurality of operative positions, in the first of which it connects the two armature-windings in series with one another and with the series field-winding, and in the last of which it connects the two armature-windings in parallel, with the series winding short-circuited.

15. In combination with a motor provided with two separate armature-windings and a field winding or windings adapted to produce different field-magnet strengths, a controlling-switch constructed and arranged to connect the two armature-windings in series with one another with the field winding or windings connected to produce a maxim field and thereafter to connect the two armature-windings in parallel with one another with the field winding or windings connected to produce a weakened field.

16. A switch for varying resistance comprising three main contact-plates, two sets of smaller contact-plates, the said two sets of plates being placed at opposite ends of two of the main contact-plates, resistance connected between the said two main contact-plates and the smaller plates, and a sliding connection for electrically connecting the plates.

RUDOLF EICKEMEYER.

Witnesses:
HENRY OSTERHELD,
RUDOLF EICKEMEYER, Jr.